Jan. 17, 1967 P. B. BANDY 3,299,210

APPARATUS FOR CONNECTING A MULTI-CHANNEL DATA PROCESSOR WITH A PLURALITY OF TELEPHONE LINES

Filed March 18, 1963 8 Sheets-Sheet 1

INVENTOR
PETER B. BANDY
BY Gunter A. Hauptman
ATTORNEY

Jan. 17, 1967 P. B. BANDY 3,299,210

APPARATUS FOR CONNECTING A MULTI-CHANNEL DATA PROCESSOR WITH A PLURALITY OF TELEPHONE LINES

Filed March 18, 1963 8 Sheets-Sheet 2

Jan. 17, 1967 P. B. BANDY 3,299,210

APPARATUS FOR CONNECTING A MULTI-CHANNEL DATA PROCESSOR WITH A PLURALITY OF TELEPHONE LINES

Filed March 18, 1963 8 Sheets-Sheet 6

COMMUNICATION SWITCHING ADAPTER 4
FLOW DIAGRAM 3,299,210
APPARATUS FOR CONNECTING A MULTI-CHANNEL DATA PROCESSOR WITH A PLURALITY OF TELEPHONE LINES

Peter B. Bandy, Poughkeepsie, N.Y., assignor to International Business Machines Corporation, New York, N.Y., a corporation of New York Filed Mar. 18, 1963, Ser. No. 265,956
13 Claims. (Cl. 179—2)

This invention relates to electronic apparatus. More specifically, this invention relates to novel means for adapting electronic data processing systems for use with communication switching equipment.

Efficient use is made of expensive data processing systems by connecting many remote users to a single centrally located processor. For example, a single high-speed electronic digital computer may perform accounting services for a large number of businesses. The relative difference in the operating speed of the computer and the rate that each business supplies information makes it possible to connect many users to the computer on a time-shared basis; each business using the computer whenever it wishes. If existing communication equipment can provide the connections between the users and the central data processing system, wasteful duplication of communication services can be avoided. Telephones being ubiquitous, the dial telephone system is a desirable connection network.

With suitable currently available apparatus it is possible to communicate computer language signals via ordinary voice-communication telephone equipment. However, prior art equipment adapting central systems to communication networks requires either a full time connection with each remote user, or manual intervention whenever a connection is necessary. In the example, each business must either lease a telephone line continuously connecting it to the central computer, or an operator must establish the connection whenever communication is desired.

It is an object of this invention to provide apparatus for automatically establishing connections, via available communication networks, between a centrally located data processing system and remotely located user equipment.

Another object is to establish connections between a central processor and remote users, by means of existing communication systems, only when necessary.

Still another object of this invention is to permit a data processing system to automatically communicate with distant locations via communication paths which are established as needed.

A further object is to provide apparatus adapting a data processor for automatic operation of switching equipment associated with a communication network connecting the processor with remote users.

An additional object of this invention is to provide apparatus utilized by a computer to operate telephone switching equipment in order to establish connections to remotely located equipment associated with the computer.

It is still another object to permit a data processor to efficiently utilize a plurality of communication paths which each may utilize telephone switching equipment to connect any one of a multiplicity of users to the processor.

The foregoing and other objects, features and advantages of the invention will be apparent from the following more particular description of the preferred embodiment of the invention, as illustrated in the accompanying drawings.

The objects are achieved by a novel communication switching adapter connecting a centrally located multichannel data processing system with a number of telephone lines. Each one of a number of remote users is assigned a telephone number. The total number of remote users may be larger than the number of telephone lines available to the data processing system; the number of lines only limiting the number of users which may simultaneously communicate with the central processor. Each telephone line is associated at the central location with a Data Telephone Set (permitting use of audio telephone lines for computer-language signals) and an Automatic Calling Unit (permitting electronic "dialing" of telephone numbers). Each Data Telephone Set, and thus each telephone line, is connected to a different "data" channel of the data processor; and, each Automatic Calling Unit is also connected to a telephone line as well as to the novel communication-switching adapter. The novel adapter is connected to a special "dialing" channel of the processor.

When a data processing system data channel is prepared to communicate with a remote user a message identifying a selected Automatic Calling Unit and the telephone number of the user may be supplied by the data processing system on the dialing channel. The adapter reacts to the information on the dialing channel by testing the selected Automatic Calling Unit, and if it is idle, initiating dialing of the desired remote user's telephone number. Once telephone switching equipment establishes a connection, the remote user communicates directly with the data processor via the data channel and Data Set associated with the selected Automatic Calling Unit. The adapter is then free to connect another data channel with another user immediately after completion of dialing of the user's telephone number. Completion of communication by a user is noted by the adapter which, in turn, notifies the processor.

The novel adapter will, as just explained, cause any "selected" Automatic Calling Unit to dial a desired user for connection to the Data Channel associated with the Automatic Calling Unit. If the selected Automatic Calling Unit is not idle, the processor may either: (a) cause the adapter to "disconnect" the current user, or (b) cause the adapter to look for another idle Automatic Calling Unit. For example, the adapter will, if desired, "hunt" for the next idle Automatic Calling Unit if a specified one is not idle; there being provided circuits in the adapter for designating the limits of a group of Automatic Calling Units among which the "hunt" is performed. The adapter may also, if so desired, "find" any Automatic Calling Unit that is idle, without regard to group limits.

In the figures:

FIGURE 1*a* is a block diagram showing an illustrative system using the invention.

FIGURES 1*b*, 1*c*, 1*d* and 1*e* are diagrams showing typical character sequences usable to control the invention.

FIGURE 2 is a logic block diagram of the invention.

FIGURE 3*a* is a logic diagram showing a deserializer which may be used in the invention.

FIGURE 3*b* is a logic diagram showing a response digit generator which may be used in the invention.

FIGURE 3*c* is a logic diagram of a translator which may be used in the invention.

FIGURE 4 is a logic diagram illustrating a typical channel control unit usable in the invention.

FIGURES 5*a*, 5*b* and 5*c*, when arranged as shown in FIGURE 5*d*, form a flow diagram showing operation of the illustrative system of FIGURE 1*a*.

GENERAL DESCRIPTION

Referring to FIGURE 1*a*, the novel communication switching adapter 4 which is the subject of this specification is shown in combination with a data processing system 1, Telephone Data Sets DS–1 through DS–9 and Automatic Calling Units ACU–1 through ACU–9. Each Data Set and each Automatic Calling Unit is connected to a telephone line from the voice and dialing equipment of a telephone central office (not shown). Every office is part of a larger dial-telephone network to which a plurality of remote users (not shown) are connected.

Dial-telephone networks are of course well known, a general discussion being found in "Electrical Communication" by A. L. Albert, Chapters 10 and 11 (Third Edition 1950, John Wiley & Sons, New York). The nature of the equipment at the remote users' location is not important to this invention, data sets, digital magnetic-tape units, teleprinters, teletypewriters, punched-card readers, card punches, or any of a wide variety of data processing peripheral equipment being usable. Each telephone line from the telephone network may be terminated for digital-data purposes by a telephone Data Set 202B (manufactured by the Western Electric Company) or its functional equivalent and each Automatic Calling Unit, shown in FIGURE 1*a* in association with a Data Set, may be a Western Electric X801A (MIO) Automatic Calling Unit or its equivalent. These devices are described, for instance, in I.E.E.E. Conference Paper CP62–1462 "Automatic Calling for Switched Data Communications Services" presented October 7–12, 1962 at the AIEE Fall General Meeting by D. W. Darling; and, I.E.E.E. Conference Paper CP62–1468 "An Automatic Calling Unit for Switched Data Communications Service", presented October 7–12, 1962 at the AIEE Fall General Meeting by P. J. Germound and K. L. Mayer.

Any type of data processing system may be utilized in connection with the invention, a message switching exchange 2 and digital computer 3 being shown in FIGURE 1*a* as illustrations. A description of a typical message switching exchange will be found in copending U.S. Patent Applications Serial No. 196,671 filed May 22, 1962 "Memory Allocation" R. M. Tomasulo et al.; Serial No. 198,841 filed May 31, 1962 "Synchronizing Apparatus" J. R. Kersey et al.; and Serial No. 230,408 filed October 15, 1962 "Character Assembly and Distribution Apparatus" C. H. Gilley et al.; all assigned to the International Business Machines Corporation, which applications are incorporated herein by this reference. A digital computer input/output data synchronizer may be used in place of a message switching exchange, a typical device of this sort being described in copending U.S. Patent Application Serial No. 705,447 filed December 26, 1957 "Data Synchronizer" Christiansen et al., which is also assigned to the International Business Machines Corporation. A description of a typical electronic digital computer usable with this invention will be found in U.S. Patent No. 3,036,773 issued May 29, 1962 "Indirect Addressing in an Electronic Data Processing Machine" J. L. Brown et al., which patent is assigned to the International Business Machines Corporation.

Still referring to FIGURE 1*a*, the communication switching adapter 4 permits the data processing system 1 to communicate with remote users via the data telephone sets DS and automatic calling units ACU. The data processing system 1 has a plurality of data channels, one of which is designated a dialing channel. The data channels, with the exception of the dialing channel, are each connected to one of the data telephone sets. The dialing channel is connected to the communication switching adapter 4 which is in turn connected by dialing control cables to automatic calling units ACU associated with the data sets DS. The data channels may each convey information destined for, or receive information from, a separate remote user. The information is, assuming that a connection has been established between a data channel and a single remote user, placed onto a telephone line via a data telephone set DS.

Automatic calling units ACU are supplied with information necessary to complete connections between remote users and data channels by the communication switching adapter 4. The dialing channel receives Binary-coded "commands" from the data processing system 1 and sends responses to the data processing system 1 to control the placement of dialing information on the dialing control cables connected to the automatic calling units. Commands usable in the invention are illustrated in the following Table I:

TABLE I

| Command | Binary Representation | Definition |
|---|---|---|
| | 16 8 4 2 1 M | |
| 27 EON | 1 1 0 1 1 1 | End of Number. A complete terminal telephone number has been supplied. |
| 28 FIND | 1 1 1 0 0 1 | Find an idle telephone line on which an indicated number is to be dialed. |
| 29 SEL | 1 1 1 0 1 1 | Select a specified telephone line and dial an indicated terminal telephone number thereon. |
| 30 HUNT | 1 1 1 1 0 1 | Hunt for an idle telephone line starting with a specified line and ending with a line manually designated as the last line in a group. A specified terminal telephone number is dialed on the idle telephone line. |
| 31 DISC | 1 1 1 1 1 1 | Disconnect the specified telephone line from the system. |

FIGURES 1*b*, 1*c*, 1*d* and 1*e* are examples of typical command messages communicated by the data processing system 1 to the communication switching adapter 4. Each message comprises a number of serially transmitted characters representing commands and numerals. In this example, each character comprises a group of six binary-representative signals (1-bits and 0-bits) the meaning of some of which are given in Table I above. Terminal telephone number dial digits are each expressed as a series of binary-representative signals each having a decimal value from zero through nine. Messages illustrated in FIGURES 1*b* through 1*e* are sent and received left-hand character first, the bits of each character being sent and received from right to left. The first (right-hand) M-bit in each character, which is always a 1-bit, is used for synchronizing purposes described in detail later.

FIGURE 1*b* illustrates a message used to initiate service of any idle data channel. The entire message is sent on the dialing channel by the data processing system 1 to the communication switching adapter 4 which interprets the command as one requiring it to search for an "idle line," meaning one which is indicated as "on hook" by its associated ACU. A channel is assumed idle, if its ACU is idle. The communication switching adapter 4 looks at every automatic calling unit ACU in turn via the dialing control cables until either an idle one is found or no lines have been found free. When the communication switching adapter 4 finds an idle automatic calling unit ACU, that ACU is operated to dial the successive digits of the terminal telephone number of the message. Commonly, a terminal telephone number comprises ten digits including three area code digits, three exchange digits and four number digits. However, any number of digits may be dialed, the end of the remote terminal telephone number being indicated by a 27 EON command. Upon completion of dialing by the automatic calling unit ACU, the communication switching adapter 4 is available for establishing another connection, in accordance with whatever message is next supplied to the dialing channel by the data processing system 1. Assuming that a successful connection is made by the associated central office dialing network equipment, the automatic calling unit ACU connects the associated data set to the desired remote user. If the remote user's terminal is busy, or if for some other reason the call cannot be completed, the data processing system 1 is notified so that it may take alternative action.

FIGURE 1*c* illustrates another message which may be supplied by the data processing system 1 to command the communication switching adapter 4 to select a particular data channel, specified by the message, if it is idle. The communication switching adapter 4 recognizes the 29 SEL command and tests the automatic calling unit specified by the binary coding of a subsequent ACU number digit supplied on the dialing channel. If the specified automatic calling unit is free, the terminal telephone number digits are supplied to the automatic calling unit for dialing as previously described, and the data channel corresponding to the selected ACU is connected to the remote user dialed. The communication switching adapter 4 notifies that the data processing system 1 via the dial channel if the specified ACU is not available.

FIGURE 1*d* illustrates still another message, this one commanding the communications switching adapter 4 to hunt for an idle channel within a specified group of data channels. The beginning of the group in which the hunt is to made is specified by an ACU number digit supplied on the dialing channel. The end of the group is preset in the communication switching adapter 4. Thus, the communication switching adapter 4 tests each automatic calling unit ACU within the desired group via the dialing control cables. If an idle data channel is found, the associated automatic calling unit ACU is operated to dial the terminal telephone number indicated in the message and the connection is completed as previously described.

FIGURE 1*e* illustrates a message used for disconnecting a data channel from a remote user. The desired data channel specified by the ACU number digit of the message, is disconnected by notifying the corresponding ACU to immediately restore an "on hook" condition.

FIGURE 2 shows the communication switching adapter 4 in greater detail. The following Table II defines the meanings of abbreviations used to simplify explanation of the adapter 4:

TABLE II

| Abbreviation: | Definition |
|---|---|
| ACR | Abandon call, retry. |
| ACU | Automatic Calling Unit. |
| CCU | Channel control unit. |
| CR | Channel control (one for each CCU). |
| D | Dial Digit Bit Position (each dial digit comprises four bits: D0, D1, D2 and D3). |
| DL | Digit loaded. |
| DP | Digit present. |
| DR | Digit request. |
| DRR | Digit register ready. |
| DS | Data Telephone set (or, "Data Set"). |
| EOG | End of Group. |
| IL | Line idle (Interlock). |
| LNA | Line not available. |
| PICK | Select or hunt requested. |
| PND | Present next digit. |
| RA | Service request. |
| REQ | Request. |

The dialing channel connecting the communication switching adapter 4 and the data processing system 1 comprises, for example, an output line 23 and an input line 24 (though one line could be used for both input and output). Note that these lines represent data paths and not necessarily electrical connections. Messages from the data processing system 1 are received on the input line 24 serially and converted to parallel form in a deserializer 7, which stores, in turn, all the signals of each character of a message in a five position register 8. Each position (or "order") R1, R2, R4, R8 and R16 of the register 8 is assigned a binary value 1, 2, 4, 8 and 16 respectively. Only the lowest four orders R1, R2, R4 and R8 of the register 8 are used in the case of telephone dial digits because four binary positions are sufficient to express a decimal number. Outputs from these four low order positions of the register 8 are designated D0, D1, D2 and D3 for this purpose.

When commands are contained in the register 8, they are transmitted via a cable 19 to an identifying translator 6 which recognizes the meanings of commands. If dial digits are contained in the register 8, they are sent to the automatic calling units ACU for use in "dialing" a user. As will be explained, dial digit information is utilized only by the ACU's and command information (including the EON character) is utilized only by the translator 6. In addition, ACU identification numbers are utilized by the channel control units CCU via cable 20. Depending upon the interpretation given by the translator 6 to the information in the register 8, one of four flip-flops 9, 10, 11 and 12 will be set to store a binary one by a signal on cable 68. The particular one of flip-flops 9, 10, 11 and 12 which is set will indicate for a period of time the command requested by the data processing system 1. The flip-flops 9, 10 and 11 remain set to the one state until the receipt of a complete terminal telephone number, as indicated by recognition of an EON character by the translator 6, causes flip-flops 9, 10 and 11 to be reset to the zero state. In the case of a "disconnect" DISC command, the trigger 12 is set to the one state, and remains so set for a predetermined period of time fixed by a delay circuit 17, operation of which is initiated by the command via an OR circuit 16. The delay 17 is calculated to approximately equal the period required to receive a complete character on input line 24. The delay circuit 17 also operates a gate 18 at the time that the second character of a message is received, whenever a HUNT, DISC or SEL command is given, causing the second character of these three messages (which character is the number of a particular specified automatic calling unit) to be transferred from the register 8 to the channel control units via cable 20.

The dialing channel receives responses from the communication switching adapter 4 on output line 23 from a response digit generator 5. Table III below illustrates several responses which may be supplied to the data processing system 1 by the communication switching adapter 4.

TABLE III

| Response | Binary Representation | Definition |
|---|---|---|
| | 16 8 4 2 1 M | |
| ϕWLINT | 0 0 0 0 0 1 | Will initiate. A "select" or a "hunt" command has been recognized by the adapter. |
| 1 DLDGT | 0 0 0 0 1 1 | Dial digit. One character of a terminal telephone number to be dialed may be supplied to the adapter. |
| 3 COMPLT | 0 0 0 1 1 1 | Complete. A complete terminal telephone number has been dialed by an ACU. |
| 7 WLDIS | 0 0 1 1 1 1 | Will disconnect. A disconnect command has been recognized by the adapter. |
| 15 NO AVL | 0 1 1 1 1 1 | Not available. The desired line (select command) is not available, or no line (find and hunt command) is available. |

Each response is transmitted serially from right to left. The first M-bit is used for synchronizing as will be explained. The responses supplied by the response digit generator 5 are functions of the commands (Table I) given by the data processing system 1. The nature of each response will be evident from the description of FIGURES 5*a*–5*c* to be given below.

Still referring to FIGURE 2, the outputs of triggers 9, 10, 11 and 12 are supplied to a plurality of channel control units CCU–1 through CCU–9 by means of cable 21. The channel control units execute the commands given by the data processing system 1 on input 24 and return signals used to generate responses on the output line 23. The channel control units are interconnected by control lines CR–1 through CR–9. Channel control unit CCU–1 has a control input CR–0 from the Find flip-flop 9 and CCU-9 has a control output CR-9. Signals on the control lines CR-0 through CR-8 are used to interrogate channel control units for corresponding idle ACU's. For example, if the data processing system 1 provides a Find command, the trigger 9 will initiate a signal which ripples through channel control units via the interconnecting control lines CR-0 through CR-8 for interrogating each channel control unit CCU in sequence until a one connected to an idle ACU command is found. If a Hunt command has been given by the data processing system 1 the control signal CR rippling action would have commenced with the channel control unit CCU specified in the character following the Hunt command and would have terminated with either the first idle ACU found or with the ACU having a channel control unit CCU internally preset as an end of group channel control unit. When a particular ACU is not idle, a signal is sent from its associated CCU via a control line CR to the next channel control unit, and so on, until an idle automatic calling unit is found. In the event that no idle ACU is found, or if a particular specified ACU is not idle, an LNA signal is supplied from the corresponding channel control unit to the cable 21 and then to an OR circuit 13. In the event of an unsuccessful Find command, a control signal CR-10 will be supplied to the OR circuit 13 by the last channel control unit CCU-9. The OR circuit 13 is operative, upon the detection of either an LNA signal or a CR-9 signal, to cause the response digit generator 5 to notify the data processing system 1 that the desired automatic calling unit, or that every ACU, is busy.

If a channel control unit CCU is associated with a selected automatic calling unit ACU, it will request one digit of a telephone number at a time by placing a signal on the digit request DR line, causing the response digit generator 5 to notify (by a 1 DLDGT "dial digit" response) the data processing system 1 that a telephone dial digit should be supplied via the dialing channel input 24. When a complete character from the data processing system 1 has been assembled in the deserializer 7, the character is placed in a digit register 8 and a signal digit register ready DRR is applied to AND circuit 14. The DRR signal, in combination with the original DR signal, places a signal on digit loaded line DL to cable 21. The active channel control unit CCU recognizes the signal DL as an indication that a dial digit is present in the register 8. As a result it will cause the associated ACU to interrogate cable 22 to receive the four digits D0 through D3 of one telephone dial digit.

As is evident from the preceding, each channel control unit CCU communicates with one automatic calling unit. A channel control unit CCU is considered to be idle if its associated automatic calling unit ACU is idle and, further, the channel control unit is not being utilized for some other purpose. The idle condition of each automatic calling unit is indicated to its associated channel control unit by an idle interlock signal line IL. When a channel control unit CCU has been selected to initiate operation of an automatic calling unit ACU, it requests service from the automatic calling unit by placing a signal on the service request line RA. The automatic calling unit will respond with a request for a dial digit on the present next digit line PND. When the channel control unit receives an indication that the requested digit is in the register 8, it will place a signal on the digit present line DP to notify the automatic calling unit of the availability of the dial digit. The automatic calling unit will then sense, as explained above, the cable 22 for a dial digit comprising bits D0 through D3 of the register 8. The automatic calling unit places this information on a telephone line for utilization by the connected central office equipment. In the event that after dialing of a complete number, the called unit is busy, the automatic calling unit will notify the channel control unit of this fact by placing a signal on the abandon call, retry line ACR.

FIGURES 5*a* and 5*c* when arranged as shown in FIGURE 5*d*, form a flow diagram illustrating operation of the entire system. The flow diagrams illustrate the sequence of operations in the data processing system 1, the communication switching adapter 4 and in the automatic calling units (ACU). Though a plurality of ACU's are connected to the adapter 4, dialing is performed through only one automatic calling unit at a time. Therefore, FIGURE 5*c* may show the operations in any one of the automatic calling units. In FIGURES 5*a*, 5*b* and 5*c*, a rectangular box generally indicates an operation; for example: "turn on find trigger." Diamond-shaped boxes, on the other hand, represent the examination of one or more conditions precedent to an operation; for example: if the "end of number" character has been received, signal that "dialing complete"; but, if it has not been received, then "forward digit to ACU." All communication between the data processing system 1 and the communication switching adapter 4 is performed over a single dialing channel. This interconnection is shown in the flow diagram of FIGURES 5*a* through 5*c* by a group of lines, each corresponding to either a command supplied by the data processing system 1 or a response supplied by the communication switching adapter 4. This only illustrates the multiple functions performed over a single channel and does not represent structure. The communication switching adapter 4 communicates with automatic calling units ACU via a number of separate lines each one of which is shown in FIGURES 5*a*, 5*b* and 5*c* as a single line.

Operation of the system in accordance with FIGURES 5*a*, 5*b* and 5*c* will now be described without, however, any specific references to these flow diagrams. A Find message constructed in the manner shown in FIGURE 1*b* includes a command 28 Find which is sent on the dialing channel input 24 to the communication switching adapter 4, where it turns on the Find trigger 9 in FIGURE 2. Scanning of automatic calling units is initiated at ACU-1 by interrogating channel control unit CCU-1 with a CR-0 signal. If CCU-1 is busy, scanning is advanced to the next CCU by an interrogating signal on the line CR-1 to control unit CCU-2. If no idle ACU is found by the time CCU-9 is interrogated, a signal emerges on line CR-9 causing the response digit generator 5 to notify the data processing system 1 of the unavailability of any ACU by means of a 15 NO AVL response. When a channel control unit associated with an idle automatic calling unit is found, the channel control unit will request attention on line RA to the automatic calling unit associated with that channel control unit. The automatic calling unit responds by placing a signal on the present next digit line PND which causes the associated channel control unit to transmit a digit request response (1 DLDGT) from the response digit generator 5 to the data processor 1. The data processing system 1, as a result, sends the first dial digit on the dialing channel input 24 to the communication switching adapter 4 deserializer 7, which loads the digit register 8. Entry of the first dial digit into the digit register 8 is indicated by a digit register ready signal DRR. AND circuit 14 supplies a digit loaded signal DL to the CCU which sends a digit present signal DP to the automatic calling unit, causing it to read the first dial digit from the digit register 8 via cable 22. When the first dial digit has been read by the automatic calling unit the present next digit line PND is deactivated causing circuitry in the channel control unit to disable the AND circuit 14 in FIGURE 2 by removing the digit ready signal DR at its input. As a result, the digit loaded DL signal is removed from the CCU, which causes the digit present line DP to be deactivated. When the DP signal ends, the automatic calling unit again places a signal on the PND line causing the response digit generator to request the second dial digit from the data processing system 1. Successive dial digits are received from the data processing system 1 and used to operate the automatic calling unit in the same manner as described for the first dial digit. Each dial digit is decoded by the translator 6 in the communication switching adapter 4 to determine whether it is an end of number EON character. When such a character is recognized, the completion of dialing is indicated to the data processing system 1 by a 3 CMPLT response from the response digit generator 5.

A Select message is illustrated in FIGURE 1c. It is not necessary to look for an idle automatic calling unit, as just described for the Find message, since the second character in the message specifies the number of a particular automatic calling unit. The recognition of a 29 SELECT command by the communication switching adapter 4 causes the response digit generator 5 to send an initiation response $\phi$ WLINT to the data processing system 1. The data processing system then sends the second character of the message, which character identifies a calling unit. The ACU identifying character is transferred to all channel control units, when gate 18 in FIGURE 2 operates, circuitry in only one CCU recognizing the character as referring to it. If the automatic calling unit associated with this channel control unit is idle, service will be requested on the request attention line RA to that automatic calling unit, and dial digits will be requested and handled as previously described. If, on the other hand, the desired automatic calling unit is not idle, the data processing system 1 is notified by the response digit generator 5 (response 15 NO AVL) that the desired unit is not available.

A Hunt message, shown in FIGURE 1d, includes features of both Find and Select messages. When the communication switching adapter 4 recognizes a 30 Hunt command it causes the response digit generator 5 to notify the data processing system 1 that it will initiate ($\phi$ WLINT) a Hunt. The data processing system 1 will then send the number of the first automatic calling unit at which a Hunt is to start. As previously described for Select, this number is decoded in the communication switching adapter 4 by only one channel control unit and the corresponding automatic calling unit is tested. If the desired automatic calling unit is idle, service will be requested by a signal on the request attention line RA. If, however, the desired automatic calling unit is not idle, the next automatic calling unit will be tested by placing a signal on the CR line interconnecting the associated channel control units. Successive testing of automatic calling units continues, as previously described for Find, until either an idle automatic calling unit is found or the last CCU in the group (EOG) in which the Hunt is performed is reached. If an idle unit is found, service is requested and dial digits obtained as previously described. If no idle unit is found by the time the end of the group is reached, the data processing system 1 is notified by a response 15 NO AVL from the response digit generator 5.

A Disconnect message comprises merely a Disconnect command 31 DISC and an automatic calling unit number designation. When the communication switching adapter 4 recognizes a Disconnect command, trigger 12 in FIGURE 2 is set on and a will disconnect response 7 WLDIS is sent from the response digit generator 5. The data processing system 1 then sends an automatic calling unit number digit which is decoded only in the channel control unit. Service request RA and related signals (for example, digit present DP) to the corresponding automatic calling unit are cancelled.

DETAILED DESCRIPTION

Circuits which may be used in the invention will now be described in detail. All circuits are made up of standard components well known in the art, the symbology used being that generally found in the literature. A trigger is indicated by a block labeled T, and is set to the "one" state by a signal pulse on its set input "S" and to the "zero" state by a signal pulse at the reset input "R." AND circuits are indicated by the "&" sign, OR circuits by the letter "O," convert circuits (which supply a true output "1" and a complement output "0") by the letter "C," inversion blocks by the letter "I," delay circuits by the letter "D," single shots by the letters "SS," etc.

Figure 3A:
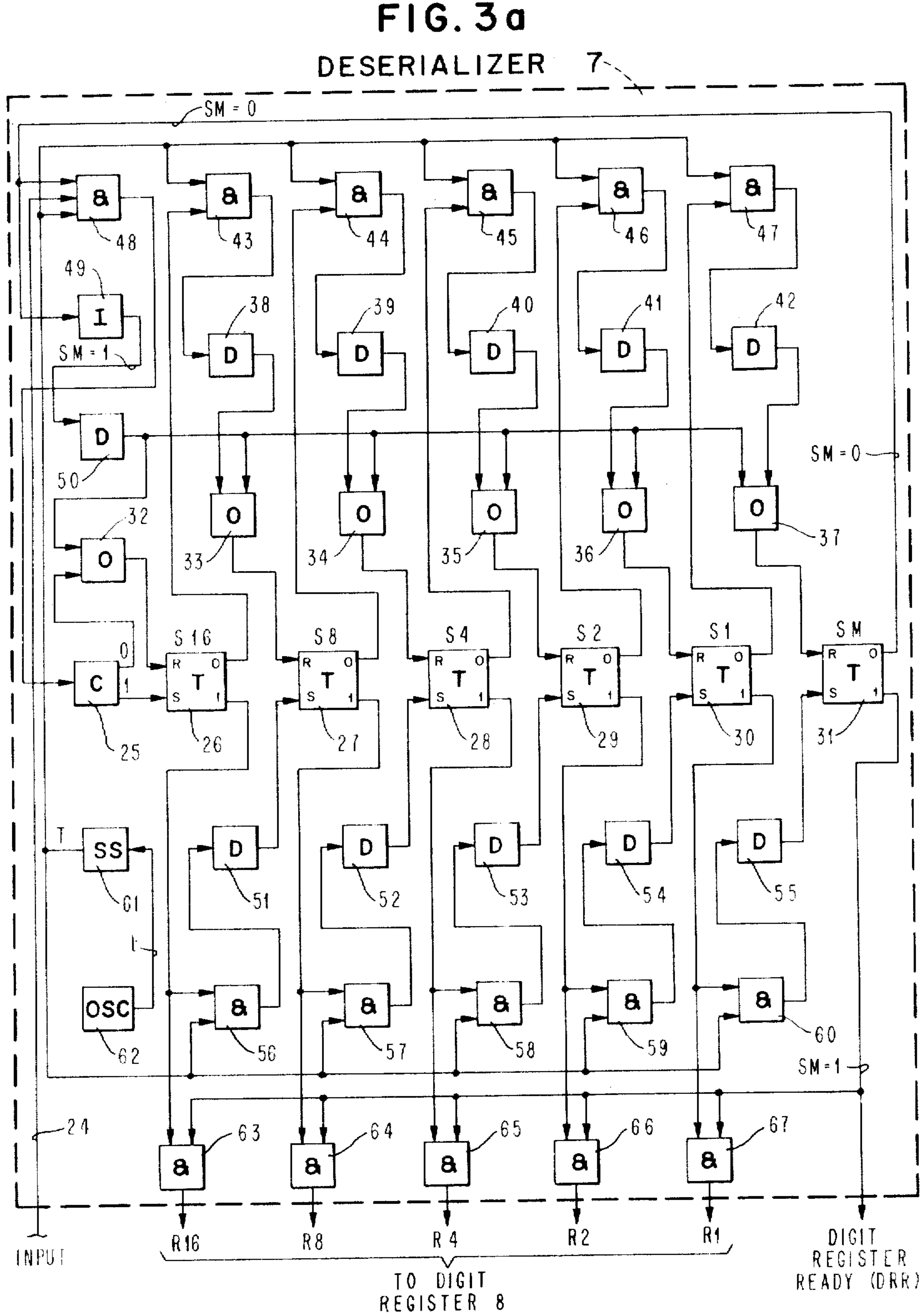

*Deserializer 7.*—Referring to FIGURE 3a, a circuit diagram of a deserializer 7 which may be used with the invention is shown. The function of the deserializer 7 is to assemble serially received signals at the input 24 and make them available as to the digit register 8 as parallel signals. Characters are represented by signals in the binary code, the first bit received being a "marker" M-bit (which is always a one bit) and the following five significant bits being assigned the binary values 1, 2, 4, 8 and 16. Bits are entered, in the order received (M-bit first), into a shift register comprising triggers 26 through 31, the entire contents of which are shifted once from left to right for each new bit entered. The M-bit of a character enters the right-most trigger 31 when a full character has been received. The five significant character bits contained in triggers 26 through 30 are then transferred in parallel to digit register 8.

More specifically, bits are received, one by one, at input 24 and applied to input AND circuit 48. Oscillator 62 supplies pulses $t$ which operate single shot SS circuit 61 to provide gating signals T timed to activate input gate 48 once for every new bit present at the input 24. Assuming that all triggers 26 through 31 are initially in the zero state, the marker trigger 31 will place a signal on the SM=0 input of input AND circuit 48. Thus, for every signal T, there will be an output from AND circuit 48 supplied to a convert circuit 25 causing the trigger 26 to store whatever signal is present at the input 24. If there is a one bit present at the input 24 the trigger 26 will be set to the one state directly by the convert circuit 25; the trigger 26 being indirectly reset to the zero state if there is an input zero bit at input 24 through an OR circuit 32. Each successive bit present at the input 24 is entered into the same trigger 26 via the input AND 48 and the convert circuit 25. As new bits are entered into the trigger 26, its contents are transferred to the next trigger 27 the contents of which are transferred to the next trigger 28 and so on.

Shifting of the contents of triggers 26 through 31 is performed by two sets of AND circuits 43 through 47 and 56 through 60. All of the AND circuits 43 through 47 and 56 through 60 are activated by each signal T from the single shot SS 61; the contents of each trigger being gated into the next trigger through one AND circuit in one, or the other, set of circuits 43 through 47 or 56 through 60. Delay circuits 38 through 42 and 51 through 55 are provided at the output of each of the shifting AND circuits to prevent overlapping of storage pulses and OR circuits 33 through 37 are provided for resetting triggers 26 through 31, as will be described. For illustration of the shifting operation, assume that there is a one bit stored in trigger 27 and a zero bit stored in trigger 26. As the next new bit from input 24 is entered into trigger 26 its contents (zero) are gated via AND circuit 43, delay circuit 38 and OR circuit 33 into the reset input R of trigger 27. Meanwhile, the contents (one) of trigger 27 are gated via AND circuit 57 and delay circuit 52 into the set inputs of trigger 28.

When six bits have been received, the first bit (the M-bit which is always a one bit) is stored in the marker trigger 31 causing an output on line SM=1 and removing the signal from the line SM=0. Termination of the SM=0 signal blocks the input gate 48 preventing entry of new bits into the register formed by triggers 26 through 31. A signal SM=1 is applied to AND circuits 63 through 67 to gate those of the triggers 26 through 31 which are set to the one state out to the digit register 8. The condition SM=1 is also sent as a signal on the digit register read line DRR to indicate that a new digit has been supplied to the digit register 8. After a delay determined by a delay circuit 50, all of the triggers 26 through 31 are reset to the zero state by a signal (derived from the "O" output of trigger 31 by an inverter 49) to OR circuits 32 through 37. The deserializer 7 is then ready for another character.

Figure 3B:
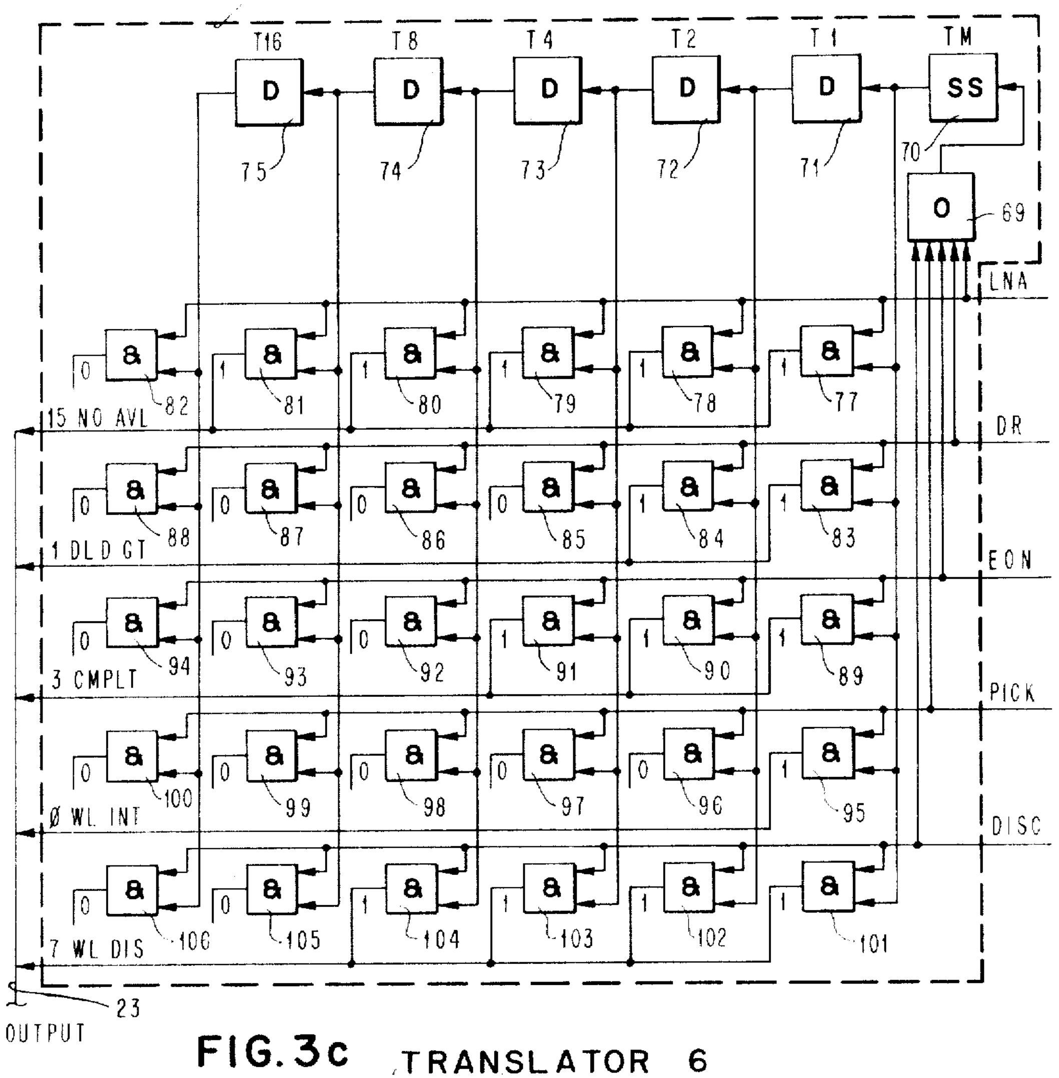

*Response digit generator 5*.—Referring to FIGURE 3*b*, the response digit generator 5 will be described. The purpose of the response digit generator 5 is to supply the serial bits of a different response (Table III, above) character corresponding to each one of separate five input signals. There are many ways to perform this function, only one possibility being shown as an illustration. Bit groups are transmitted serially, in the binary code, lowest order first, to the output line 23 in response to a signal on any one of the control input lines LNA, DR, EON, PICK or DISC. The lowest order of each character transmitted by the response digit generator 5 is preceded by a marker M-bit which is always a one.

Each one of the controlled input lines is assigned six AND circuits in a matrix formed by AND circuits 77 through 106. Every AND circuit is assigned to one controlled input line and corresponds to one bit position of a character. For example, AND circuits 77, 83, 89, 95 and 101 represent the marker M-bit preceding each binary character; AND circuits 78, 84, 90, 96 and 102 represent the lowest order binary value, etc. The output of each AND circuit is connected to the output line 23 if the bit to which it corresponds is to be a one; otherwise, it is not connected to the output 23. For example, AND circuits 77 through 82 are connected to represent the character 011111 (transmitted, as will be explained, from right to left), which represents the binary value 15 preceded by a fixed-value marker bit.

Whenever a signal appears on one of the control input lines, all of the AND circuits in the matrix row associated with that line are enabled. Further, the signal causes a succession of timed pulses to be applied to each matrix column of AND circuits in turn. The succession of pulses is obtained, for example, by applying all the control input signals to a single shot SS circuit 70 and delay circuits 71 through 75 by way of an OR circuit 69. As the signal propagates down the line of circuits 70 through 75, each corresponding column of AND circuits is, in turn enabled. Thus, when a control input line has a signal applied to it, every AND circuit in sequence from right to left in its row will emit a signal. A one-bit will be transmitted on output line 23 from those AND circuits connected to that line; otherwise, the effect is to transmit a zero bit on line 23. For example if a PICK signal appears, the gates 95 through 100 are enabled and a pulse ripples through circuits 70 through 75, activating AND circuits 95 through 100 one at a time from right to left. The binary value 000001 (7 WLDIS) will be applied to output 23 right-hand orders first.

Figure 3C:
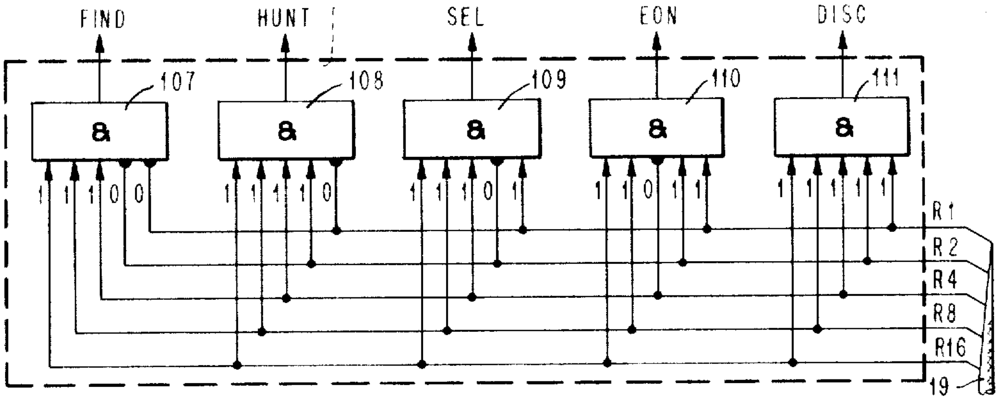

*Translator 6*.—FIGURE 3*c* is a circuit diagram of a translator which may be used to recognize commands (Table I, above) received from the data processing system 1. Each new command from the data processing system 1, after deserialization by the deserializer 7 and entry into digit register 8, is made available to the translator 6 on cable 19. The five lines R1, R2, R4, R8 and R16 comprising cable 19 are each applied to every one of the AND circuits 107 through 111. An AND circuit will have an output only if there is a one bit signal on every input indicated by an arrowhead and a zero bit signal on every input indicated by a semi-circle. For example, if every one of the lines R1, R2, R4, R8 and R16 has a one bit signal present on it, all of the inputs to AND circuit 111 will be satisfied and there will be an output DISC.

Figure 2:
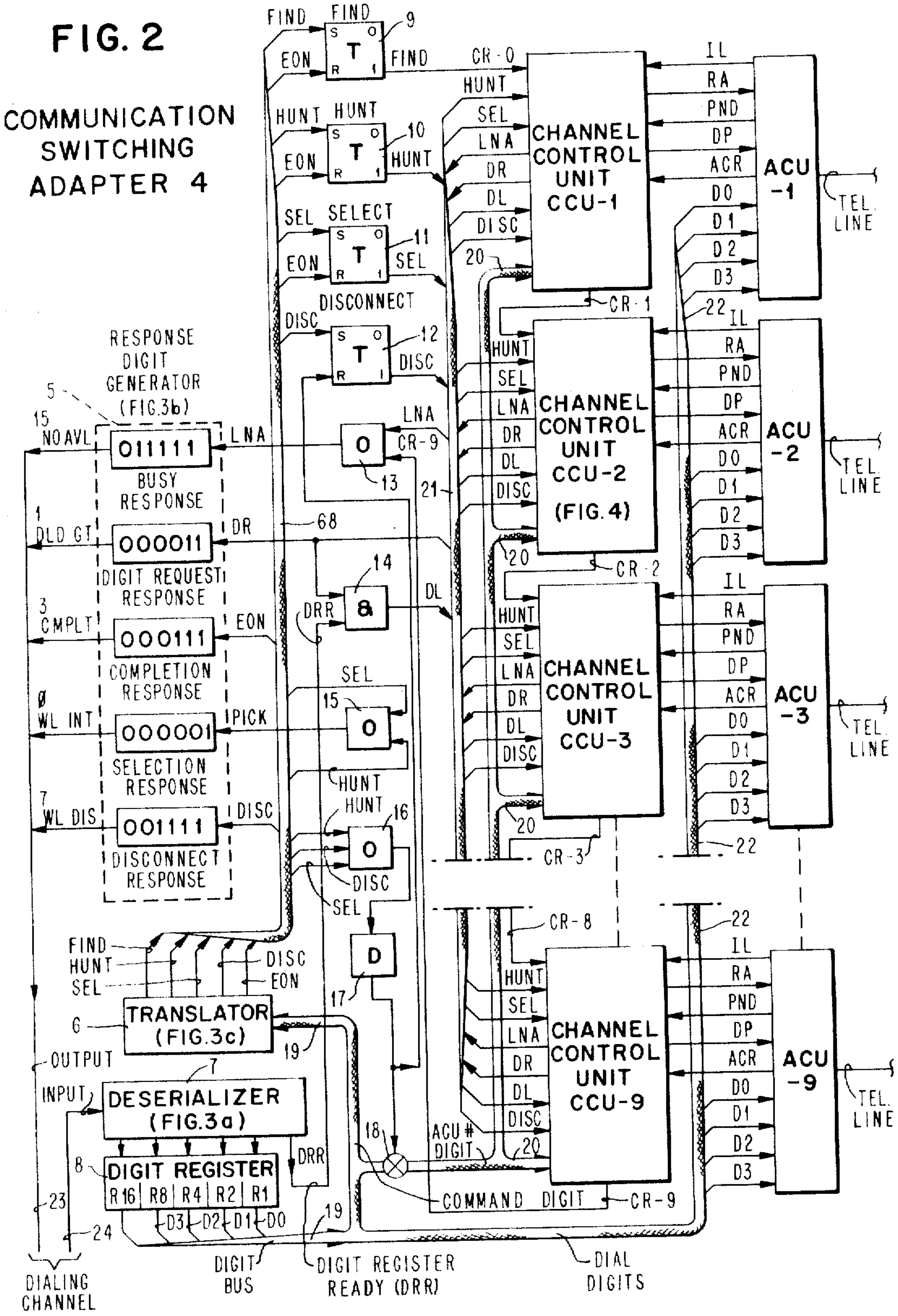
Figure 4:
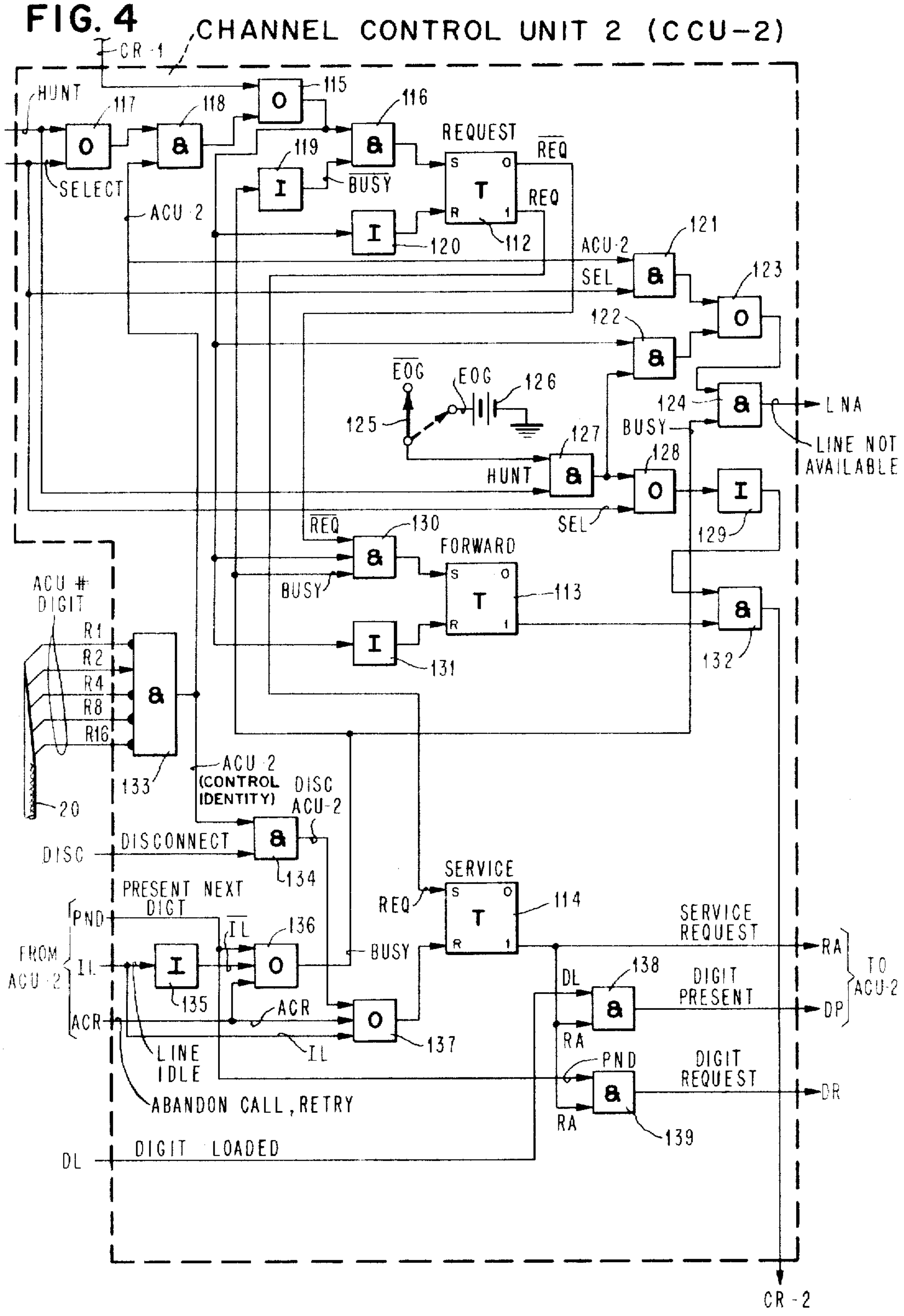

*Channel control units*.—FIGURE 4 is a circuit diagram of one of the nine channel control units shown in FIGURE 2. All of the channel control units are identical, channel control unit 2 (CCU–2) being shown for illustration. Each channel control unit CCU has a CR input from the previous channel control unit and a CR output to the next channel control unit. For example, channel control unit 2 has an input CR–1 and an output CR–2. Each channel control unit communicates with the communication switching adapter 4 via lines labeled: hunt, select, disconnect, digit loaded, line not available, digit request and ACU digits R1, R2, R4, R8 and R16. Each channel control unit communicates with an associated automatic calling unit via lines labeled: present next digit, line idle, abandon call retry, service request and digit present.

Figure 5A:
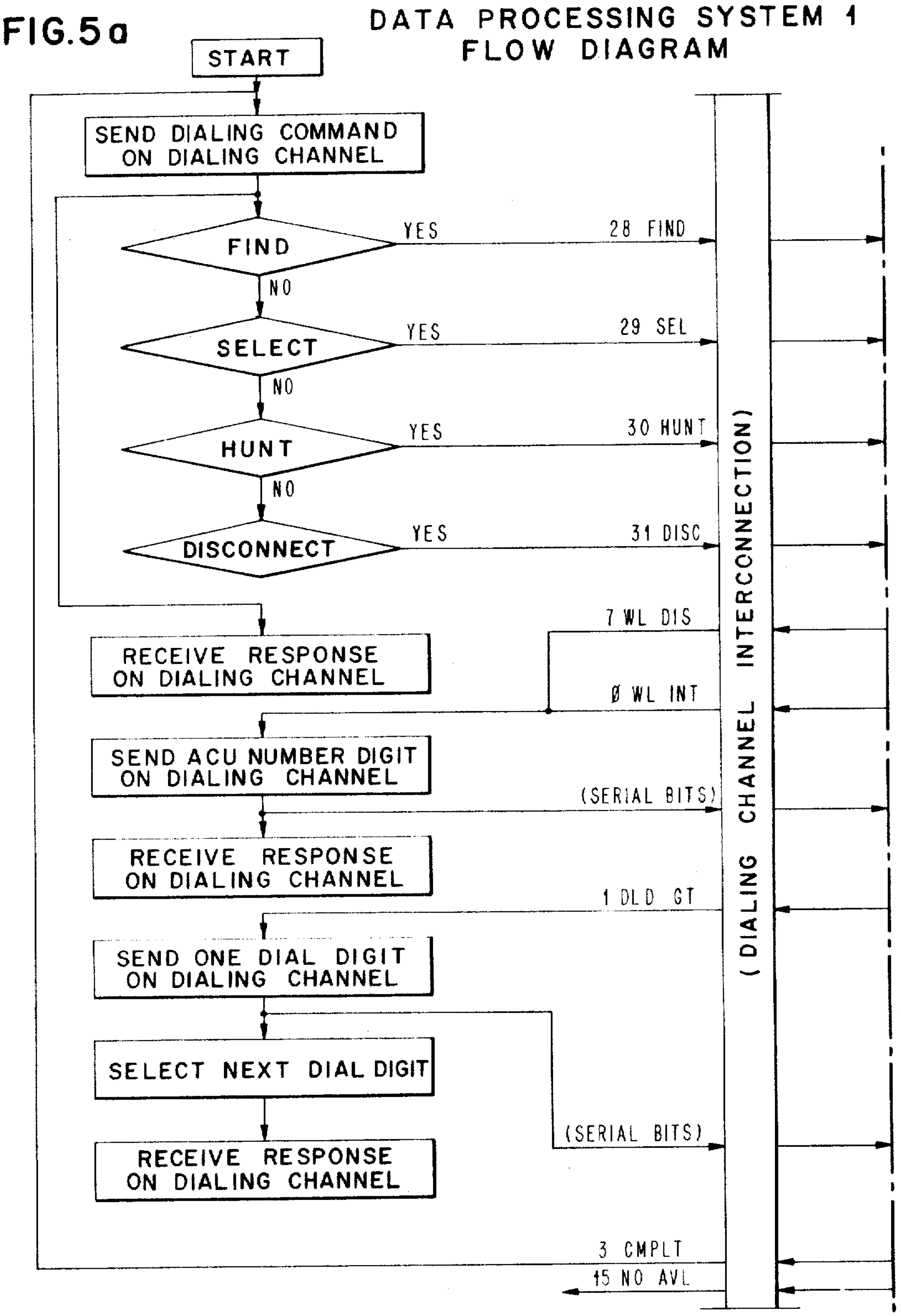
Figure 5B:
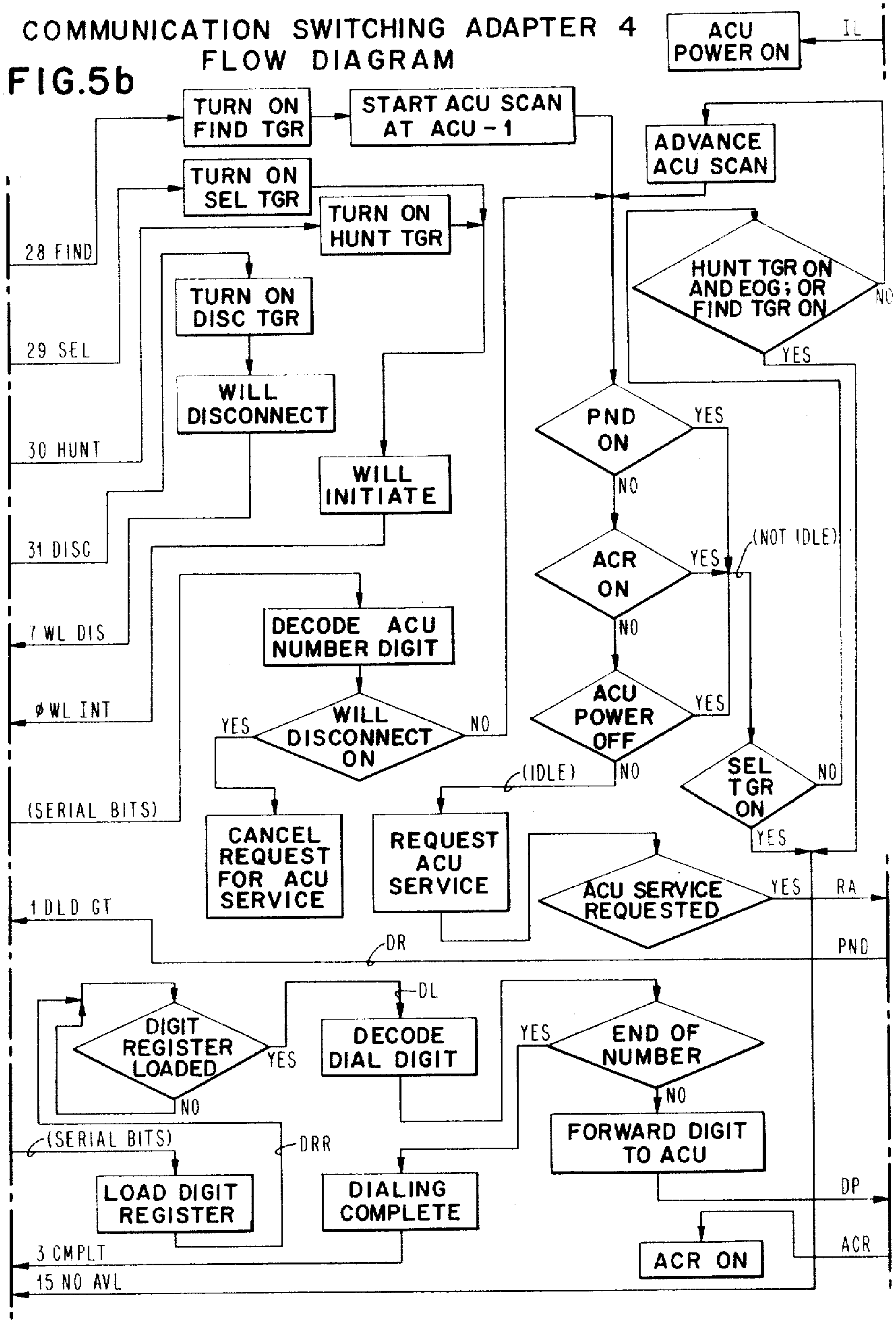
Figures 5C, 5D:
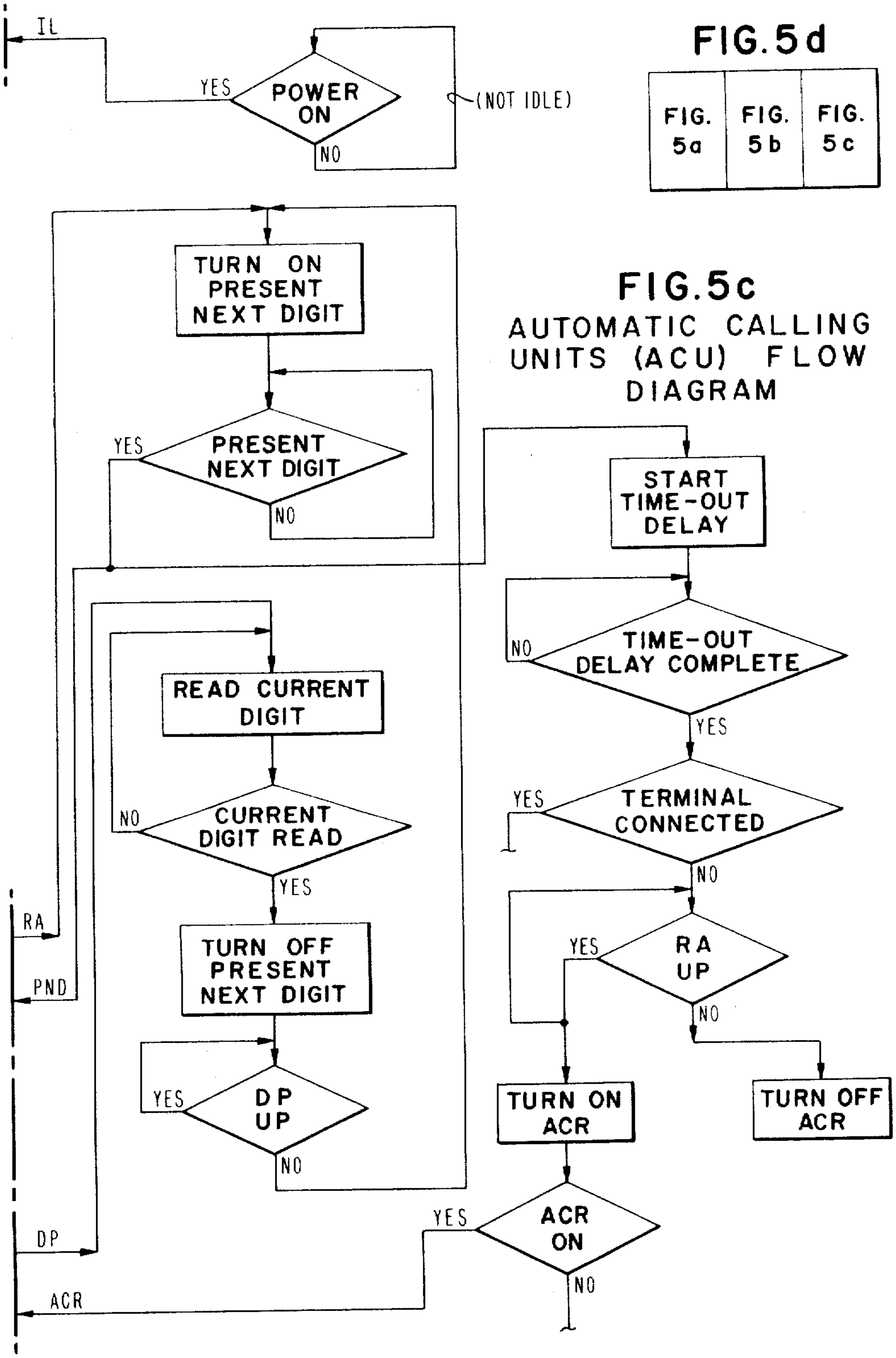

In general, the channel control unit 2 comprises three triggers 112, 113 and 114 which record the need for, and the availability of, service. The data processing system 1 requests service for its channels by means of commands (hunt, select, disconnect, find) and the automatic calling units indicate availability by signals (on lines: line idle and abandon call retry). Assume that service is requested for a channel connected to the ACU corresponding to channel control unit 2. If service can be granted (that is, if ACU–2 is not "busy") both the request trigger 112 and the service trigger 114 will be set causing CCU–2 to ask ACU–2 for service. On the other hand, if ACU–2 is "busy," or if for some other reason service cannot be granted for this line, only the forward trigger 113 may be set to the one state to forward a service request to the next channel control unit CCU–3. In this way, in one application a channel control unit associated with an idle automatic calling unit will request service from the ACU, while a CCU associated with a busy automatic calling unit will forward a signal to the next CCU which tests its ACU, etc., until an idle ACU is found. An automatic calling unit is not idle ($\overline{IL}$) if its power is off (see FIGURE 5*c*). This, obviously, is an arbitrary condition which can, with simple circuitry, be reversed. An automatic calling unit is unavailable for use ("busy") if it is not idle, as just defined, or if it is either in the process of dialing a number (a signal will then usually be on the present next digit line PND) or if it cannot complete a dialed call (as indicated by a signal on line ACR). Reference is made to FIGURE 4 which shows a "busy" output from OR circuit 136 if there is a signal on either line PND or ACR or if the signal on line IL is removed (detected as a $\overline{IL}$ output from inverter 135).

If the data processing system 1 has transmitted a Find command, each channel control unit will be tested in turn starting with CCU–1 for an idle condition. Initially triggers 112, 113 and 114 in CCU–2 are reset to zero state due to the normal absence of a signal on line CR–1 and the normal presence of a signal on the IL line. Assuming that ACU–1 is busy, a signal will appear at input CR–1 of channel control unit 2. If ACU–2 is not busy ($\overline{busy}$) both inputs of AND circuit 116 will be satisfied causing the request trigger 112 to be set to the one state. The service trigger 114 is set to the one state, placing a signal on the service request line RA by the REQ output of trigger 112. The automatic calling unit ACU–2 responds to the service request signal on line RA by placing a present next digit signal on line PND. This "busies" CCU–2 via OR circuit 136 and activates AND circuit 139 to place a signal on digit request line DR to the response digit generator 5 in FIGURE 2 asking for a dial digit. When the dial digit is available, a signal appears on line DL, the presence of which is indicated to the ACU–2 by a signal on digit present line DP from AND circuit 138. When the automatic calling unit has used the dial digit it requests another one by interrupting the signal on the line PND. This causes the DL signal to fall (due to AND circuit 14 in FIGURE 2) removing the signal DP at the output of AND circuit 138. The ACU–2 then restores the PND signal to request the next dial digit. This interchange of control signals continues as long as the service trigger 114 remains set to the one state, which normally remains so set during dialing and subsequent communication with a remote user. The service trigger 114 is reset to the zero state through OR circuit 137 if the ACU–2 indicates on the line ACR that a called line cannot be reached, if the ACU indicates (by an interruption of the signal on the line IL) that communication with a remote user is finished, or if the channel control unit 2 is specifically disconnected as will be explained below.

If, when a signal appears at the input CR–1, the ACU–2 is busy, the request trigger 112 is not set to the one state, it remaining in its initial state. Therefore, all inputs to the AND circuit 130 will be satisfied causing the forward trigger 113 to be set to the one state. Assuming that a Find command caused the appearance of a signal on line CR–2, there will be an output from an invert circuit 129 (since there was neither a Hunt nor a Select command), causing an output from AND circuit 132 which is forwarded on line CR–2 to the next channel control unit CCU–3. Thus CR signals are propagated from channel control unit to channel control unit until one is found that is associated with an idle ACU. If none is found, a signal will emerge from the last line CR–10 which, as shown in FIGURE 2, causes the response digit generator 5 to notify the data processing system 1 that no lines are available.

Signals on the line CR–1 may occur in response to the Hunt command also. A Hunt command, in effect, causes the "Find" operation to be confined within a specified group. The Hunt operation starts at a channel control unit specified as part of the Hunt command message by the data processing system 1, and ends at a channel control unit which is preset to be the end of the group within which the Hunt is to be confined. In FIGURE 4, an AND circuit 133, connected via cable 20 to the register 8 of FIGURE 2, has an ACU–2 (control identity) output only if the character in the register 8 specifies the Automatic Calling Unit ACU–2 associated with the channel control unit CCU–2. One AND circuit, similar to AND circuit 133 in CCU–2, is provided in every other channel control unit, the inputs being arranged to provide a control identity output only when the register 8 contents identify the ACU associated with its channel control unit. Since a Hunt command causes trigger 10 in FIGURE 2 to be set, a signal is applied to OR circuit 117, resulting in an output from AND circuit 118 only if AND circuit 133 indicates that the ACU associated with CCU–2 has been identified. Thus, either the Hunt command or the Find command (which places a signal on line CR–1 if CCU–1 is busy) may cause an output from OR circuit 115. A Hunt command will cause the request trigger 112 to be set to the one state via OR circuit 115, if inverter 119 indicates that the associated automatic calling unit ACU–2 is "not busy" ($\overline{\text{busy}}$). As a consequence, the request trigger 112 and service trigger 114 will both be set to the one state if ACU–2 is idle; and, if ACU–2 is busy, the request trigger 112 will remain reset to the zero state while the forward trigger 113 is set to the one state via AND circuit 130. Assuming that channel control unit CCU–2 is not the end of a group, AND circuit 132 will, in the busy case, forward a signal on line CR–2 to the next channel control unit CCU–3. The end of a Hunt group is indicated by the position of a switch 125 which, when placed in the EOG position to connect a battery 126 to AND circuit 127, indicates that channel control unit 2 is the end of a group. During Hunt, if CCU–2 is the last channel control unit in its group, there will be an output from AND circuit 127 blocking AND circuit 132 from placing a signal on line CR–2 by action of the inverter 129. The output of AND circuit 127 also indicates that no idle line was found while Hunting, by placing a signal on line LNA via AND circuit 122, OR circuit 123 and AND circuit 124.

Disconnect and Select commands are effective in CCU–2 only if recognized by AND circuit 133. Thus, if a Disconnect command is directed to channel control unit CCU–2 the service trigger 114 will be reset via AND circuit 134 and OR circuit 137. If a Select command is directed to channel control unit CCU–2, the request trigger 112 is set to the one state, as previously described for Hunting and Finding, if ACU–2 is not busy. As a result, during Select, the request trigger 112 "1" output will set the request trigger 112 and 114 to the one state if ACU–2 is idle; and, if ACU–2 is busy, request trigger 112 will remain set to the zero state and forward trigger 113 will be set. In the Select case however, the forward trigger 113 output will not pass through AND circuit 132 since the Select command activates inverter 129 through OR circuit 128. If ACU–2 is busy when Selected, the AND circuit 121 output is applied to AND circuit 124 via OR circuit 123 to place a line not available signal on line LNA. All other channel control units are similar in construction, and operation during Select and Disconnect, to CCU–2.

DETAILED OPERATION

Figure 1A:
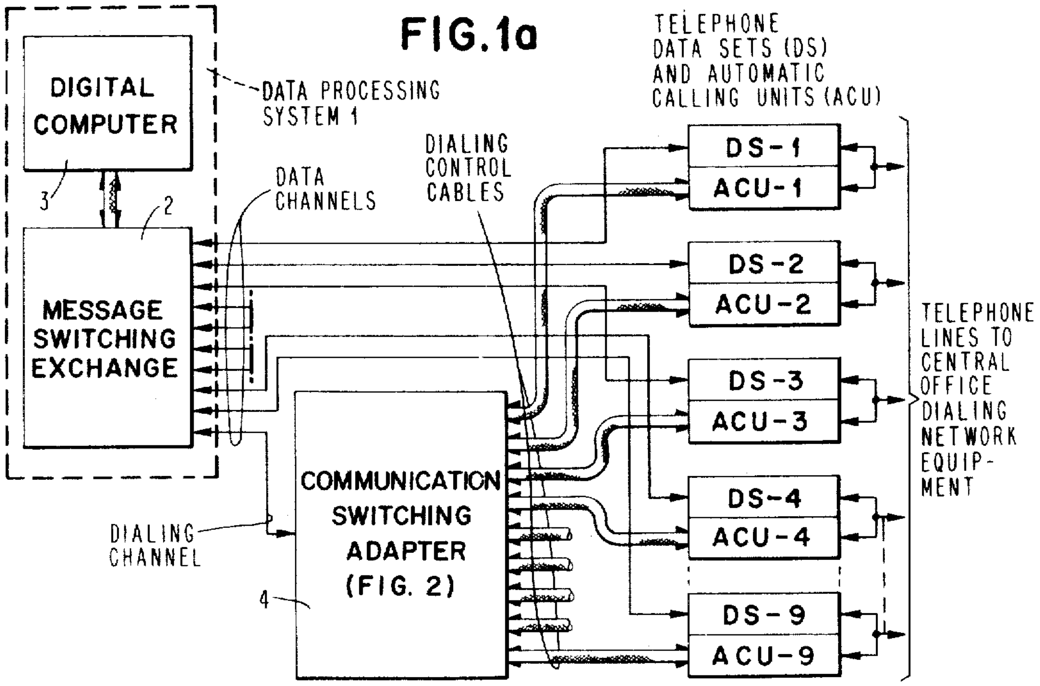
Figure 1B:
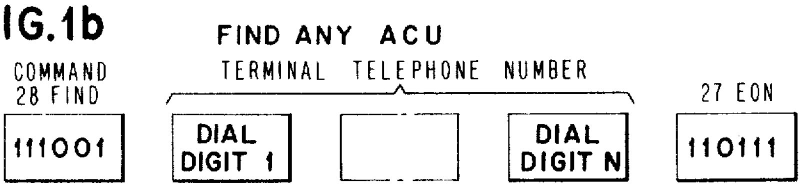
Figure 1C:
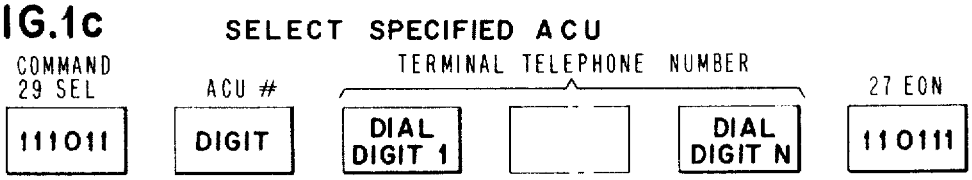
Figure 1D:
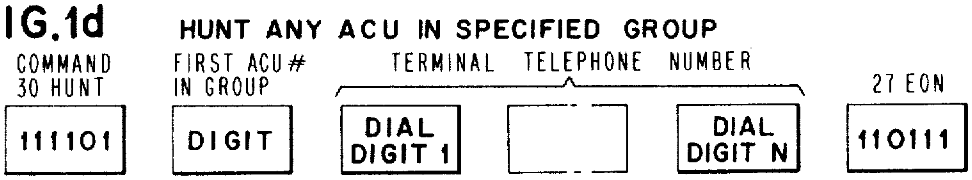
Figure 1E:
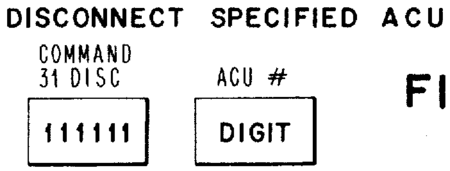

A detailed example of operation of the invention will now be described with reference to the figures. Referring first to FIGURE 1*a*, it will be assumed that automatic calling unit ACU–1 is busy ($\overline{\text{IL}}$) and that all the rest of the automatic calling units are idle (IL). The first command message (FIGURE 1*c*) to be received from the data processing system 1 selects ACU–2 for the dialing of a terminal telephone number, the particular telephone number dialed being irrelevant. Next, the data processing system supplies a Hunt command (FIGURE 1*d*) which specifies that Hunting within a group be started with ACU–2, a switch in CCU–9 being set to indicate that ACU–9 is the end of the group. If an idle ACU is found in this group, dialing of number supplied as part of the message will be performed. Then, the data processing system 1 supplies a Find command (FIGURE 1*b*) which causes dialing of a telephone number specified in the message over the first idle ACU found. Finally, the data processing system 1 commands that ACU–2 be disconnected (FIGURE 1*e*).

Analysis of this series of commands indicates that the select command message will operate the ACU–2. The Hunt command, which starts with ACU–2, will cause dialing via ACU–3 since ACU–2 has already been selected. The Find message will cause dialing operations to commence from ACU–4 since ACU–1 is initially busy and ACU–2 and ACU–3 have just been utilized. Finally, the Disconnect command will free ACU–2 for dialing.

*Select ACU–2 Message.*—The select command is serially received at input 24 of the deserializer 7 shown in FIGURE 3*a* as binary bits 111011, in order from right to left. The oscillator 62 operates the single shot 61 at a rate which enables input gate 48 to enter the first received bit (1) into the trigger 26 via the convert circuit 25. Then, the next single shot 61 output signal T, causes the contents (1) of the trigger 26 to be transferred via AND circuit 56 into trigger 27 while the next bit (1) is entered into trigger 26 via input AND gate 48 and convert circuit 25. The next pulse T transfers the one bit in trigger 27 to trigger 28 via AND circuit 57 and transfers the one bit in trigger 26 to trigger 27 via AND circuit 56, a zero being entered into trigger 26 via input AND gate 48 and convert circuit 25. The next pulse T transfers the one bit in trigger 28 to trigger 29 via the AND circuit 58 and transfers the one bit in trigger 27 to trigger 28 via AND circuit 57 while the zero bit in trigger 26 is transferred to trigger 27 via the AND circuit 43; the next received bit (a one bit) being entered into trigger 26 via AND circuit 48 and convert circuit 25. A new bit is entered, and all stored bits are shifted one position for each output T of the single shot 61 as just described. Eventually, the first bit received (the M-bit, a fixed-value one bit) is stored in trigger 31 and all successive bits of the Select command are stored in proper ones of the triggers 26 through 30. When the trigger 31 is set to the one state further entry of bits into the trigger 26 is prevented by blockage of the input gate 48, and the contents of triggers 26 through 30 are transferred in parallel to digit register 8 via AND circuit 63 through 67. The loading of digit register 8 is indicated by trigger 31 output DRR. After a delay determined by delay circuit 50, all triggers 26 through 31 are reset.

In FIGURE 2, the contents of register 8 are transferred via cable 19 to the translator 6 of FIGURE 3*c*. The signals from register 8 positions R1, R2, R4, R8 and R16 cause an output from AND circuit 109 which places a signal on the select line SEL.

Referring to FIGURE 2 again, the Select trigger 11 is set to the one state and a signal is applied to OR circuit 16, which, after a fixed delay determined by delay circuit 17, causes operation of gate 18. The timing, as previously described, is such that gate 18 will operate when a new character (which in this case specifies a particular automatic calling unit ACU–2) is in the digit register 8. The next character (000101 specifying ACU–2) of the message is received on input line 24 and is handled by the deserializer 7, as just described, to enter the binary number 00010 in parallel in the register 8. Operation of the gate 18, in FIGURE 2, causes the contents (00010) of register 8 to be sent to all channel control units on cable 20.

Referring to FIGURE 4, the signals (representing the binary number 00010) operate AND circuit 133 in CCU–2. The Select command having set select trigger 11 of FIGURE 2 to the one state, there is an input on line SEL to the OR circuit 117. Therefore, since AND circuit 118 has both its inputs satisfied, it being previously assumed that ACU–2 is not busy, the request trigger 112 is set to the one state. As a result, service trigger 114 is set to the one state and a service request is sent to ACU–2 on line RA. The ACU–2 responds with a present next digit signal on line PND and an interruption of potential on line IL, either of which causes channel control unit CCU–2 to appear busy to further requests (via OR circuit 136). The PND signal from ACU–2 also causes a digit request DR to be sent to the communication switching adapter 4 FIGURE 2 on line DR, which is applied to the response generator 5. In FIGURE 3*b*, AND circuits 83 through 88 are enabled and a sequence of signals are generated by circuits 70 through 75, in that order. As a result, a response 1 DLDGT (000011, reading from right to left) is sent via output line 23 to the data processing system 1. In FIGURE 2, the data processing system 1 responds by placing the first digit of a telephone number on line 24 to the deserializer 7. This number is handled as previously described and is transferred in parallel to the digit register 8. The marker bit preceding the significant bits of the number causes a signal on line DRR from the deserializer 7 which is applied to AND circuit 14 causing an output on digit loaded line DL to all channel control units. In FIGURE 4, the signal on line DL causes an output from AND circuit 138 which indicates to ACU–2 on line DP that a digit is present in the register 8. When the ACU–2 is ready, it will read the first digit on lines D0, D1, D2 and D3 of cable 22. The ACU–2 signals for the second dial digit by removing the signal on line PND which disables AND circuit 139 output DR in FIGURE 4 and AND circuit 14 output DL in FIGURE 2, which in turn disables AND circuit 138 output DL in FIGURE 4. The ACU–2 responds to the removal of the signal on line DP by restoring the signal on line PND. In this manner, the data processing system 1 is notified that a new dial digit is required and all the above dial digit supply operations will be repeated.

All the contents of the digit register 8 are examined by the translator of FIGURE 3*c*. Dial digits have no effect but the end of a telephone number is recognized by AND circuit 110, which places a signal on line EON of FIGURE 2. The signal EON causes trigger 11 to be reset and applies a signal on the EON input of the response digit generator 5. In FIGURE 3*b*, AND circuits 89 through 94 will send a 3 CMPLT response to the data processing system 1 indicating that the complete telephone number of the remote user has been transmitted by ACU–2. Subsequently the data channel connected to data telephone set DS–2 may communicate with the remote user dialed if the connection is successfully completed by the telephone switching equipment. In FIGURE 4 request trigger 112 is reset to the zero state via inverter 120 by removal of the Select input from trigger 11 in FIGURE 2. Service trigger 114 remains set until the ACU–2 indicates termination of the call by restoring the signal on line IL (or when ACU–2 is specifically disconnected). If the call cannot be completed via ACU–2, an ACR signal will reset service trigger 114.

*Hunt from ACU–2 Message.*—The next character placed on the input line 24 of FIGURE 2 by the data processing system 1 is a Hunt command specifying that hunting begin at ACU–2. This command is deserialized by the deserializer 7 as previously described and after transfer to the register 8 is recognized by the translator 6 as a Hunt command which causes the hunt flip-flop 10 to be set to the one state, causing a delayed operation of the gate 18 as previously described, and placing a signal on the pick line via the OR circuit 15. The pick line causes operation of the response generator 5 of FIGURE 3*b*, AND circuits 95 through 100 to inform the data processing system 1 via a character $\phi$ WLINT that a hunt operation will be initiated. The data processor 1 responds to the $\phi$ WLINT character by supplying on line 24 to the deserializer 7 a character (000101) identifying ACU–2. The deserializer 7 places the binary character 00010 in the register 8, which character is available on cable 20 when gate 18 operates. Referring to FIGURE 4, the character (00010) on cable 20 is recognized by AND circuit 133 as referring to ACU–2. As a result of this recognition and the Hunt signal present at the Hunt input of OR circuit 117, there is an output from AND circuit 118 which supplies a signal to one side of AND circuit 116. The other input of AND circuit 116 is, however, blocked by an output from invert circuit 119 due to a busy signal from ACU–2, the IL output of which indicates ($\overline{IL}$) that it is presently being used. Therefore, the request trigger 112 remains in the zero state causing the forward trigger 113 to be set to the one state. Since CCU–2 is not the end of a group (switch 125 is in the $\overline{EOG}$ position) an output from AND circuit 132 sends a signal on line CR–2 to channel control unit CCU–3.

Channel control unit CCU–2 is similar in construction to channel control unit 2 of FIGURE 4 with the exception that its equivalent of AND circuit 133 will not have an output since it is activated only by a character (00011) identifying ACU–3. Since CCU–3 is not busy, the appearance of a CR–2 input causes its request trigger to be set to the one state. As a result, the service trigger of CCU–3 is set to the one state sending a service request RA to ACU–3. The dialing of a terminal telephone number via ACU–3 is then performed under control of channel control unit 3 in the manner previously described for CCU–2. When the EON character following the dial number is recognized by the translator 6 of FIGURE 2, the Hunt trigger 10 in FIGURE 2 and, thus, the request trigger in CCU–3 are reset. The CCU–3 service trigger remains set as long as the IL line from ACU–3 indicates ($\overline{IL}$) activity.

*Find Message.*—Subsequently, the data processing system 1 supplies a Find command to the deserializer 7 on input 24. The deserializer 7 transfers the bits comprising the Find command to the register 8 and the translator 6 places a signal on the find line causing find trigger 9 to be set to the one state. The channel control units, starting with CCU–1, are then interrogated in turn to find an idle ACU. Interrogation, initiated by a Find command, always starts with the first channel control unit CCU–1 via input CR–0.

Referring to FIGURE 4, which is similar in construction to CCU–1, a CR–0 input (shown in FIGURE 4 as the CR–1 input of CCU–2) results in the setting of the forward trigger of CCU–1 since the IL line from ACU–1 is assumed to indicate that it is busy. As a result CCU–1 emits a signal on line CR–1 to channel control unit CCU–2. The forward trigger of CCU–2 is also set to the one state since its associated automatic calling unit ACU–2 is busy, causing a signal to be applied at its output CR–2 to the channel control unit CCU–3. Similarly, the forward trigger of CCU–3 is set to the one state since its associated ACU–3 is busy, causing an output on line CR–3 to channel control unit CCU–4. Channel control unit CCU–4 is not currently used; therefore, its request trigger will be set to the one state and its service trigger will send a service request on line RA to ACU–4. ACU–4 will respond with a present next digit signal on line PND to CCU–1 causing a signal to be placed on the digit request line DR to the response digit generator 5. A digit request response 1 DLDGT is then sent to the data processing system 1 to initiate the dialing of the first digit by ACU–4. Dialing progressing as previously described. When the EON character is detected by the translator 6, the Find trigger 9 in FIGURE 2 is reset, causing the request trigger of CCU–4 and the forward triggers of CCU–1, CCU–2 and CCU–3 to be reset.

*Disconnect ACU–2 Message.*—When dialing on ACU–4 is completed, indicated by the transmission of a completion response 3 CMPLT by the response digit generator 5, the data processing system 1 will supply a command specifying that ACU–2 be disconnected. In FIGURE 2, the disconnect command passes through the deserializer 7 into the register 8 and is decoded in the translator 6, causing the disconnect trigger 12 to be set to the one state. The gate 18 is operated when the next character (000101 identifying ACU–2) on dialing channel line 24 enters the register 8.

Referring to FIGURE 4, the AND circuit 133 recognizes the digits (0010) on cable 20 as referring to ACU–2 and a signal appears on disconnect line DISC from the disconnect flip-flop 12. There is, therefore, an output from AND circuit 134 causing the service flip-flop 114 to be reset, ending the signal on service request line RA and disabling AND circuits 138 and 139. The ACU–2 responds by activating (IL) the line IL. As a result, the channel control unit CCU–2 will indicate during subsequent operations that ACU–2 is idle.

There has been described apparatus for adapting electronic data processing systems for use with telephone switching equipment. A data processing system sends commands to a communication switching adapter which chooses an automatic calling unit by means of which telephone dialing equipment may be utilized. The communication switching adapter notifies the data processing system of its actions by means of response characters. The communication switching adapter is capable of interrogating every automatic calling unit until an idle one is found, of selecting a particular automatic calling unit, of hunting for an idle automatic calling unit in any designated group and of disconnecting any desired automatic calling unit from its telephone line.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for dialing remote locations from a central data processing system through telephone lines connected to a telephone switching exchange including:
   - a plurality of channels, including a dialing channel, connected to said central data processing system;
   - a plurality of telephone dialing and data communication circuits, connected to telephone lines from said telephone switching exchange;
   - a register, connected to said dialing channel, for serially receiving dialing messages comprising commands and dialing information from said data processing system;
   - a translator, connected to said register, for recognizing different commands and generating a different command signal for each command recognized;
   - a response generator, connected to said dialing channel, for serially supplying to said data processing system different responses as a function of different response signals;
   - a plurality of first control circuits, each connected to a corresponding one of said communication circuits, each operable to generate a "not busy" signal if the associated telephone line is not busy;
   - a plurality of second control circuits, each connected to a corresponding one of said first control circuits and to said translator, each operable in accordance with command signals to interrogate said first control circuits for "not busy" signals;
   - a plurality of third control circuits, each connected to a corresponding one of said second control circuits and to said response generator, each operable in accordance with the results of interrogation by said second control circuits to supply response signals to said response generator; and
   - a plurality of fourth control circuits, each connected to a corresponding one of said communication circuits and to said register, each operable to supply dialing information to said communication circuits from said register.

2. In combination with a central processor and remote users connected to communication switching equipment:
   - a plurality of channels, connected to said central processor;
   - a plurality of lines, connected to said communication switching equipment;
   - receiving means connected to a first channel for receiving switching information from said central processor;
   - control means connected to said receiving means and to said lines operable in response to switching information from said first channel to supply switching information to said communication switching equipment via one of said lines at a time; and
   - means connected to said control means, said lines and said channels, operable after switching information is supplied to said communication switching equipment via one of said lines to initiate establishment of communication between a user, via said one line, and one of said channels other than said first channel.

3. In apparatus for automatically controlling the connection of a computer with a plurality of remote users, a plurality of control circuits associated with a plurality of corresponding user lines, each circuit including:
   - first storage means for supplying a "request" signal indicating a request for the use of the corresponding line;
   - monitoring means for supplying a "line idle" signal indicating availability for use of the corresponding line;
   - second storage means, connected to said first storage means and to said monitoring means, operable to generate a "service request" signal for use by the corresponding line when both said "request" and said "line idle" signals are present; and third storage means, connected to said first storage means and to said monitoring means, operable to generate a control signal, for initiating a request for the use of a line corresponding to another one of said circuits, when said "request signal" is present and said "line idle" signal is absent.

4. In a communication switching system for linking a centrally-located multi-channel processor with a plurality of remotely-located users of said processor via a number of communication paths, an adapter comprising:

input means, connected to one channel of the processor, operative to receive, one at a time, switching messages from said processor;

translation means, connected to said input means, for emitting class signals indicative of different classes of switching messages received from said processor;

control means, connected to said input means, to said translation means and to said communication paths, for supplying switching message portions from said input means to paths one at a time in accordance with class signals emitted by said translation means;

said control means including:

(a) a plurality of first circuit means, every one corresponding to a different communication path, each operable to emit a control identity signal when a switching message refers to the corresponding path; and (b) a plurality of second circuit means, every one corresponding to a different communication path, each connected to a corresponding first circuit means, operable by a control identity signal from the corresponding first circuit means to supply a switching message portion to the corresponding path when a first class signal is emitted by said translation means.

5. The adapter of claim 4, said control means further including:

a plurality of third circuit means, every one corresponding to a different communication path, each connected to a corresponding first circuit means, operable by a control identity signal from the corresponding first circuit means to disconnect the corresponding path when a second class signal is emitted by said translation means.

6. In a communication switching system for linking a centrally-located multi-channel processor with a plurality of remotely-located users of said processor via a number of communication paths, an adapter comprising:

input means, connected to one channel of the processor, operative to receive, one at a time, switching messages from said processor;

translation means, connected to said input means, for emitting class signals indicative of different classes of switching messages received from said processor;

control means, connected to said input means, to said translation means and to said communication paths, for supplying switching message portions from said input means to paths one at a time in accordance with class signals emitted by said translation means;

said control means including:

(a) a plurality of first logic means, every one corresponding to a different communication path, each operable to generate a "not busy" signal when the corresponding path is not busy; and (b) a plurality of second logic means, every one corresponding to a different communication path, each connected to a corresponding first logic means, operable when particular class signals are emitted by said translation means to supply a switching message portion to a path corresponding to a "'not busy" signal from a first logic circuit.

7. The adapter of claim 6, said control means further including:

a plurality of third logic means, every one corresponding to a different communication path, each connected to a corresponding first logic means and second logic means, operable by particular class signals to examine in sequence said first logic means for "not busy" signals and to indicate to the corresponding second logic means the first "not busy" signal encountered.

8. The adapter of claim 7, said control means also including:

a plurality of end indicators, every one corresponding to a different one of said number of communication paths, each operable to indicate the end of a selected sequential group of such paths; and a plurality of fourth logic means, every one corresponding to a different communication path, each connected to a corresponding end indicator and third logic means, operable by a selected class signal to prevent examination by said third logic means of first logic means corresponding, and succeeding in sequence, to an operated end indicator.

9. A communication switching system comprising:

a centrally-located multi-channel processor;

a plurality of remotely-located users of said processor;

a number of communication paths linking said processor with said users;

input means, connected to one channel of the processor, operative to receive; one at a time, switching messages from said processor;

translation means, connected to said input means, for emitting class signals indicative of different classes of switching messages received from said processor;

control means, connected to said input means, to said translation means and to said communication paths, for supplying switching message portions from said input means to paths one at a time in accordance with class signals emitted by said translation means;

said control means including:

(a) a plurality of first circuit means, every one corresponding to a different communication path, each operable to emit a control identity signal when a switching message refers to the corresponding path; and (b) a plurality of second circuit means, every one corresponding to a different communication path, each connected to a corresponding first circuit means, operable by a control identity signal from the corresponding first circuit means to supply a switching message portion to the corresponding path when a first class signal is emitted by said translation means.

10. The system of claim 9, said control means further including:

a plurality of third circuit means, every one corresponding to a different communication path, each connected a corresponding first circuit means, operable by a control identity signal from the corresponding first circuit means to disconnect the corresponding path when a second class signal is emitted by said translation means.

11. A communication switching system comprising:

a centrally-located multi-channel processor;

a plurality of remotely-located users of said processor;

a number of communication paths linking said processor with said users;

input means, connected to one channel of the processor, operative to receive, one at a time, switching messages from said processor;

translation means, connected to said input means, for emitting class signals indicative of different classes of switching messages received from said processor;

control means, connected to said input means, to said translation means and to said communication paths, for supplying switching message portions from said input means to paths one at a time in accordance with class signals emitted by said translation means;

said control means including:

(a) a plurality of first logic means, every one corresponding to a different communication path, each operable to generate a "not busy" signal when the corresponding path is not busy; and (b) a plurality of second logic means, every one corresponding to a different communication path, each connected to a corresponding first logic means, operable when particular class signals are emitted by said translation means to supply a switching message portion to a path corresponding to a "not busy" signal from a first logic circuit.

12. The system of claim 11, said control means further including:

a plurality of third logic means, every one corresponding to a different communication path, each connected to a corresponding first logic means and second logic means, operable by particular class signals to examine in sequence said first logic means for "not busy" signals and to indicate to the corresponding second logic means the first "not busy" signal encountered.

13. The system of claim 12, said control means also including:

a plurality of end indicators, every one corresponding to a different one of said number of communication paths, each operable to indicate the end of a selected sequential group of such paths; and a plurality of fourth logic means, every one corresponding to a different communication path, each connected to a corresponding end indicator and third logic means, operable by a selected class signal to prevent examination by said third logic means of first logic means corresponding, and succeeding in sequence, to an operated end indicator.

References Cited by the Examiner

UNITED STATES PATENTS

| | | | |
|---|---|---|---|
| 3,007,136 | 10/1961 | Tyrlick | 328—154 X |
| 3,223,976 | 12/1965 | Abbott et al. | 179—15 X |
| 3,226,687 | 12/1965 | Amdahl et al. | 179—15 X |

DAVID G. REDINBAUGH, *Primary Examiner.*

J. T. STRATMAN, *Assistant Examiner.*